United States Patent [19]

Sukornick

[11] 3,953,585
[45] Apr. 27, 1976

[54] MANUFACTURE OF OXYGEN DIFLUORIDE
[75] Inventor: Bernard Sukornick, Elizabeth, N.J.
[73] Assignee: Allied Chemical Corporation, New York, N.Y.
[22] Filed: Dec. 27, 1960
[21] Appl. No.: 78,766

[52] U.S. Cl. .............................................. 423/489
[51] Int. Cl.$^2$.......................................... C01B 9/08
[58] Field of Search ............... 23/205; 423/489, 579

[56] References Cited
OTHER PUBLICATIONS
Mellor, "Comprehensive Treatise on Organic and Theo. Chem.," Vol. 8, pp. 407, 410–417, (1928).
"Fluorine Chemistry," Vol. 1, pp. 82–84, Vol. II, pp. 63, 64, (1954).

Primary Examiner—Benjamin R. Padgett
Assistant Examiner—R. E. Schafer
Attorney, Agent, or Firm—Jay P. Friedenson; Ernest A. Polin

[57] ABSTRACT

The process of making oxygen difluoride which comprises subjecting alkali metal hyponitrite containing 2-5 oxygen atoms, at temperature not substantially above 40°C., to the action of elemental fluorine in quantity and for a time sufficient to effect reaction of the fluorine with a substantial amount of hyponitrite to form a substantial quantity of oxygen difluoride, and recovering oxygen difluoride.

10 Claims, No Drawings

MANUFACTURE OF OXYGEN DIFLUORIDE

This invention relates to improved processes for making oxygen difluoride, $OF_2$, b.p. minus 145° C., a known compound of powerful fluorinating and oxidizing properties.

It has been proposed to make oxygen difluoride by passing elemental fluorine into a 2% aqueous sodium hydroxide solution which holds oxygenated impurities in non-volatile form. Sodium hydroxide concentration must be held constant to effect any appreciable formation of $OF_2$, and must be held low to avoid $OF_2$ decomposition. Further, there is always danger of an explosive reaction between fluorine and NaOH, and moreover only about 5% of the fluorine input goes to $OF_2$, the balance to HF. It has also been suggested to make oxygen difluoride by reaction of elemental fluorine and perchloric acid flowing over graphite. By this method, the usual product contains mostly approximately equal volumes of oxygen and $OF_2$. Separation of the oxygen difluoride and oxygen, and purification of $OF_2$ require fractionating technique involving use of liquid air and the inherent low temperatures of the general order of minus 180°-minus 195° C. Moreover, and most objectionably, the perchloric acid method involves formation of small amounts of a chlorine-oxygen-fluorine compound by-product which is highly unstable and explosive. Disadvantages of prior art methods are such that none presents any commercial potentialities.

A major object of this invention is to provide a commercially practicable method for making oxygen difluoride.

In accordance with the invention, it has been found that the invention objectives may be accomplished by effecting certain controlled reactions of elemental fluorine and a hyponitrite of an alkali forming metal, all of which are available raw materials. Discovery of the commercially feasible reactability of elemental fluorine and hyponitrites of an alkali forming metal affords several outstanding operating advantages. The elemental fluorine-hyponitrite reaction itself may be carried out over a wide temperature range, and need not in any case be below only moderately low temperatures. Dependent upon particular procedural modification employed, gaseous reaction products formed are only one, namely oxygen difluoride, or only two, nitrous oxide and oxygen difluoride, i.e. materials which have widely separated boiling points and hence can be separated easily. Apparatus required is simple and easily operated. Further, maximum low temperatures needed at any point in the process is not materially below about minus 150° C.

In general, reaction between elemental fluorine and hyponitrites of alkali forming metals may be typified by

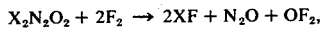
$X_2N_2O_2 + 2F_2 \rightarrow 2XF + N_2O + OF_2$,

$YN_2O_2 + 2F_2 \rightarrow YF_2 + N_2O + OF_2$,

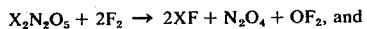
$X_2N_2O_5 + 2F_2 \rightarrow 2XF + N_2O_4 + OF_2$, and

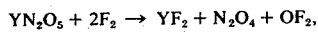
$YN_2O_5 + 2F_2 \rightarrow YF_2 + N_2O_4 + OF_2$, where X is an alkali metal atom and Y is an alkaline earth metal atom.

The hyponitrites of an alkali forming metal which may be employed are alkali metal or alkaline earth hyponitrites or mixtures thereof. The alkali metals may include sodium, potassium and lithium, and the alkaline earth metals may include calcium, magnesium and barium. Hyponitrite compounds may be of varying degree of oxidation, and include those containing two to five inclusive oxygen atoms, preferably those containing two, three and five oxygen atoms. Preferred alkali metal is sodium, and examples of the preferred hyponitrite starting materials are $Na_2N_2O_2$, $Na_2N_2O_3$ and $Na_2N_2O_5$. Gaseous products formed when any of the foregoing are fluorinated with elemental fluorine include the sought-for oxygen difluoride, and in the case of use of the lower oxygenated hyponitrite starting materials, such as the di- and tri-oxygenated compounds, gaseous products exiting the reaction zone also include nitrous oxide, $N_2O$.

Broadly considered, practice of the invention comprises subjecting the particular alkali forming metal hyponitrite starting material, at certain herein noted temperatures and in a suitable reaction zone, to the action of elemental fluorine in quantity and for a time sufficient to effect reaction of the fluorine with a substantial amount of the hyponitrite to form a substantial quantity of the oxygen difluoride, and recovering the latter from the gaseous exit of the reaction zone. Elemental fluorine is employed in the usual form of a gas, and the hyponitrite may be in solid form or as a suspension in a suitable liquid reaction medium.

Apparatus employed is relatively simple and comprises a reactor, adapted to hold the hyponitrite starting material and solid reaction products, provided with an inlet for introduction of metered quantities of elemental fluorine and an inert diluting gas if desired, and with a gas outlet. In the case of use of hyponitrite in solid form, the reactor may be tubular, and when hyponitrite is employed employed in the form of a suspension in a suitable liquid, the reactor may be pot-like and arranged for introduction of elemental fluorine gas at or near the bottom of the liquor pool therein. Whether the hyponitrite is employed as a solid or in suspension form, it will be understood that the reactor has associated therewith suitable refrigerating equipment to facilitate maintenance of reaction temperatures as stated herein. The gas outlet of the reactor may be connected to the gas inlet of a cold trap equipped with refrigerating facilities to maintain the trap at temperatures suitably below the minus 145° C. boiling point of oxygen difluroide, e.g. at temperatures in the range of minus 150°–155° C. The trap may be provided with a gas vent to permit, during the reaction phase of a run, passage thru the trap of unreacted fluorine and any inert diluting gas. The cold trap may be equipped with other valved outlets thru which, during a reaction run, liquid condensate may be drawn off of a fractionator, or, following a reaction run, condensate may be fractionated off to storage or further purification. Apparatus may be made of any suitable material such as mild steel, Monel, copper, and nickel, which is corrosive resistant to the reactants and product involved.

Elemental fluorine may be supplied as such to the reactor. However, because of practical inconveniences of handling fluorine per se, it is desirable to charge fluorine as a gas diluted with usually at least an equal volume of inert gas such as nitrogen, helium, or argon. Preferably, elemental fluorine is charged as a constituent of a gas containing by volume 80–90% nitrogen and 20–10% elemental fluorine. Use of a relatively highly inertly diluted elemental fluorine facilitates handling, control and smoothness of reaction.

Reaction of fluorine with hyponitrite, in all modifications of practice of the invention, may be carried out over a relatively broad temperature range. While temperatures as high as about 40° C. may be employed, no particular advantages are afforded, and higher reaction temperatures are not preferred. In reactions of the type under consideration, to promote good control and minimize hazards, temperatures are preferably lower and ordinarily should not exceed room temperature, i.e. about 20° C. Reaction control is progressively facilitated by maintenance of progessively lower temperatures. Nitrous oxide, b.p. minus 89.9° C., is formed in some modifications of the invention. To effect removal of nitrous oxide from the reaction zone along with the oxygen difluoride, minimium reaction zone temperature is preferably held just reasonably above the boiling point of nitrous oxide. Thus, as to all modifications, reaction temperatures are preferably below plus 40° C. and are ordinarily in the range of from plus 20° C. down to conveniently above the boiling point of nitrous oxide. For maximum safety and ease of reaction control, reactions may be efficiently carried out in a reactor refrigerated by means of an acetone-dry ice mixture, a common refrigerant providing a low temperature of about minus 70-minus 80° C.

As noted, the metal hyponitrite starting material may be employed, during reaction with fluorine, in the form of a solid or as a suspension in a suitable inert liquid. In some instances, to promote thoroughness of reaction and utilization of fluorine and hyponitrite, it is preferable to utilize the latter in the fluorine reaction in the form of a suspension. The liquid reaction medium may be any suitable organic compound which is liquid at the temperature of operation and which is inert to the action of elemental fluorine and the products of reaction. For this purpose, it is preferred to employ saturated perhalofluorocarbons which are liquid at least at the temperature of operation and preferably which are liquid throughout a good portion of the range of about minus 80-plus 40° C. Examples of suitable reaction media are 1,2,3-trichloropentafluoropropane, b.p. 73.7° C., m.p. minus 72° C.; 2,2,3-trichloroheptafluorobutane, b.p. 97.5° C., m.p. minus 4° C., 1,2-dichloroheptafluoropropane, b.p. 34.7° C., m.p. minus 136° C.; and Fluorochemical FC-75 (Minnesota Mining & Manufacturing Company) b.p. 97°–107° C., m.p. below minus 113° C. Quantity of liquid reaction medium employed is a matter of convenience, but should be sufficient to provide a liquor reaction mass which may be readily agitated.

When employing the lower oxygenated hyponitrites such as $Na_2N_2O_2$ and $Na_2N_2O_3$, nitrous oxide is formed along with solid alkali metal fluoride. At reaction temperatures above the minus 89.8° C. boiling point of nitrous oxide, the $N_2O$ is in gas form and is discharged from the reactor along with the oxygen difluoride. Recovery of oxygen difluoride may be effected as by condensation in a refrigerated cold trap. Both the $N_2O$ and the $OF_2$ exit of the reactor are condensed and liquefied in the cold trap maintained at about minus 150° C.- minus 155° C., just adequately below the minus 145° C. boiling point of oxygen difluoride. During the reaction phase of any particular run, unreacted fluorine together with inert diluting gas such as nitrogen if employed are vented from the cold trap and discharged from the system. The cold trap may be provided with a liquid outlet by means of which the cold trap condensate, a liquid mixture of $N_2O$ and $OF_2$, is continuously discharged into a fractionator. The latter may be operated more or less conventionally to take off substantially pure oxygen difluoride as overhead and retain the nitrous oxide as liquid bottoms in the fractionator. Alternatively, at the end of a batch reaction, the cold trap may be operated fractionator-wise, and warmed up sufficiently to provide an overhead take-off of substantially pure oxygen difluoride, the higher boiling $Na_2O$ remaining in the trap as liquid bottoms.

In accordance with the invention, it has been found that when utilizing as starting material, the higher oxygenated hyponitrite such as $Na_2N_2O_5$, it is possible to carry out the fluorine-hyponitrite reaction in such a way as to provide a gaseous reactor exit which is substantially pure oxygen difluoride. While the chemical reactions involved are not completely understood, experience has shown (basis, Example IV) that in carrying out the reaction of elemental fluorine and $Na_2N_2O_5$ at temperature below the about minus 9° C. melting point of nitrogen peroxide, $N_2O_4$, the latter is formed in the reactor as by-product in solid form in admixture with the solid alkali metal fluoride, the result being that the gaseous exit of the reactor is substantially pure oxygen difluoride. Thus, in this modification of the invention, employing the higher oxygenated hyponitrite, preferably containing five oxygen atoms, as starting material, it is preferred to maintain temperatures in the reactor from about minus 70°-minus 80° C. up to about minus 20° C. In this procedure, the oxygen difluoride discharged as a gas from the reactor may be recovered in a cold trap as previously described, and redistilled for purification if desired. At the end of any given run nitrogen oxides retained in the reactor along with the solid alkali metal fluoride may be separated from the latter and recovered in substantially pure form by distillation, e.g. by heating to temperatures above the plus 22° C. boiling point of $N_2O_4$ to recover the latter.

The following examples illustrate practice of the invention:

EXAMPLE I

About 1.6 gms. of dry substantially pure sodium hyponitrite ($Na_2N_2O_2$) were placed in a reactor comprising a glass U-tube provided with a gas inlet and a gas outlet. The reactor was flushed preliminarily with nitrogen. A gas stream, containing by volume about 90% nitrogen and about 10% fluorine, was passed over the solid for about five hours. Rate of fluorine flow was about 0.02 mol/hr. Throughout the run, temperature in the reactor was maintained at about minus 20°–25° C. by means of liquid $CCl_2F_2$. Reaction proceeded smoothly, probably in accordance with $Na_2N_2O_2 + 2F_2 \rightarrow 2NaF + N_2O + OF_2$. The gaseous exit of the reactor was fed into a cold trap maintained at about minus 150° C. by means of a mixture of liquid $CCl_2F_2$ cooled by liquid nitrogen. Nitrogen diluent and unreacted fluorine passed thru the trap. Water white condensate collected in the cold trap was vaporized, and the vapor was subjected to infrared analysis which showed substantially equal volume quantities of nitrous oxide ($N_2O$) and oxygen difluoride. The solid residue in the reactor was mostly sodium fluoride, and analyzed about 49.8% Na and 39.2% F.

EXAMPLE II

Apparatus employed was as in Example I. About 1.1 gms. of dry, substantially pure sodium hyponitrite ($Na_2N_2O_2$) were placed in the reactor which was flushed preliminarily with nitrogen. A gas stream, containing by volume about 80% nitrogen and about 20% fluorine, was passed over the solid for about six hours. Rate of fluorine flow was about 0.02 mol/hr. Throughout the run, temperature in the reactor was maintained at about minus 20°–25° C. as in Example I. Reaction proceeded smoothly. The gaseous exit of the reactor was fed into the cold trap maintained at about minus 150° C. as in Example I. Nitrogen diluent and unreacted fluorine passed thru the trap. Water white condensate collected in the cold trap was vaporized and the vapor was subjected to infrared analysis which showed the material to be substantially the same composition as in Example I, i.e. about equal quantities of nitrous oxide ($N_2O$) and oxygen difluoride. X-ray analysis showed the solid residue in the reactor to be almost completely sodium fluoride.

EXAMPLE III

About 0.51 gm. of sodium B-oxyhyponitrite, one form of $Na_2N_2O_3$, and 150 mls. of liquid 1,2,3-trichloropentafluoropropane (B.P. 73.7° C., M.P. minus 72° C.) were charged into a 200 ml. reactor such as in Examples I and II. After flushing with nitrogen, the slurry was agitated, and a gas stream containing about 90% nitrogen by volume and about 10% fluorine was passed into the slurry for a period of three hours. Rate of fluorine flow was about 0.04 mol/hr. Throughout the run, temperature in the reactor was maintained at about 0° C. by means of cracked ice. Reaction proceeded smoothly, probably in accordance with $Na_2N_2O_3 + 3F_2 \rightarrow 2NaF + N_2O + 2OF_2$. The gaseous exit of the reactor was fed into a cold trap maintained at about minus 155° C. by means of liquid $CCl_2F_2$ cooled by liquid nitrogen. Nitrogen diluent and unreacted fluorine passed thru the trap. Condensate collected in the cold trap was vaporized, and the vapor was subjected to infrared analysis which showed the material to be oxygen difluoride and nitrous oxide ($N_2O$) in volume ratio of about 3 to one. The solid residue in the reactor was almost completely sodium fluoride.

EXAMPLE IV

About 0.6 gm. of $Na_2N_2O_5$ and 150 mls. of liquid 1,2,3-trichloropentafluoropropane were charged into a 200 ml. reactor as in Example III. After flushing with nitrogen, the slurry was agitated and a gas stream containing about 90% nitrogen by volume and about 10% fluorine was passed into the slurry for a period of about 6 hrs. Rate of fluorine flow was about 0.04 mol/hr., and temperature in the reactor system was maintained at the order of minus 70° C. by means of an acetone-dry ice mixture. Reaction proceeded smoothly, probably in accordance with $Na_2N_2O_5 + 2F_2 \rightarrow 2NaF + N_2O_4 + OF_2$. Gaseous exit of the reactor was fed into a cold trap maintained at about minus 150°–155° C. by means of liquid $CCl_2F_2$ cooled by liquid nitrogen. Nitrogen diluent and unreacted fluorine passed thru the trap. At the end of the run, condensate collected in the cold trap was permitted to warm up to about room temperature and the vapor given off was recovered. Such vapor was subjected to infrared analysis which showed the material to be only oxygen difluoride. The residue in the reactor contained NaF, and oxide of nitrogen in solid form.

I claim:

1. The process for making oxygen difluoride which comprises subjecting alkali metal hyponitrite containing 2–5 oxygen atoms, at temperature not substantially above 40° C., to the action of elemental fluorine in quantity and for a time sufficient to effect reaction of the fluorine with a substantial amount of hyponitrite to form a substantial quantity of oxygen difluoride, and recovering oxygen difluoride.

2. The process of claim 1 in which the alkali metal is sodium, and temperature is substantially in the range of minus 80-plus 40° C.

3. The process of claim 1 in which temperature is substantially that of an acetone-dry ice mixture.

4. The process for making oxygen difluoride which comprises forming a suspension of alkali metal hyponitrite containing 2–5 oxygen atoms in a saturated perhalofluorocarbon which is liquid at temperature of operation and which is inert to the action of elemental fluorine and oxygen difluoride, maintaining said suspension at temperature substantially in the range of minus 80-plus 40° C., introducing inertly diluted elemental fluorine into said suspension in quantity and for a time sufficient to effect reaction of the fluorine with a substantial amount of hyponitrite to form a substantial quantity of oxygen difluoride, and recovering oxygen difluoride.

5. The process for making oxygen difluoride which comprises forming in a reaction zone a suspension of sodium hyponitrite containing 2–5 oxygen atoms in a saturated perhalofluorocarbon which is liquid at temperature of operation and which is inert to the action of elemental fluorine and oxygen difluoride, maintaining said zone and said suspension at temperature substantially that of an acetone-dry ice mixture, introducing inertly diluted elemental fluorine into said suspension in quantity and for a time sufficient to effect reaction of the fluorine with a substantial amount of hyponitrite to form a substantial quantity of oxygen difluoride, discharging oxygen difluoride from said zone, and recovering oxygen difluoride.

6. The process for making oxygen difluoride which comprises subjecting alkali metal hyponitrite containing five oxygen atoms at temperature not substantially above 40° C., to the action of elemental fluorine in quantity and for a time sufficient to effect reaction of the fluorine with a substantial amount of said hyponitrite to form a substantial quantity of oxygen difluoride, and recovering oxygen difluoride.

7. The process of claim 6 in which temperature is substantially in the range of minus 80-minus 20° C.

8. The process of claim 6 in which the alkali metal is sodium.

9. The process for making oxygen difluoride which comprises subjecting $Na_2N_2O_5$, at temperature substantially that of an acetone-dry ice mixture, to the action of elemental fluorine in quantity and for a time sufficient to effect reaction of the fluorine with a substantial amount of said $Na_2N_2O_5$ to form a substantial quantity of oxygen difluoride, and recovering oxygen difluoride.

10. The process for making oxygen difluoride which comprises forming in a reaction zone a suspension of $Na_2N_2O_5$ in a saturated perhalofluorocarbon which is liquid at temperature of operation and which is inert to the action of elemental fluorine and oxygen difluoride, maintaining said zone and said suspension at temperature substantially that of an acetone-dry ice mixture, introducing inertly diluted elemental fluorine into said suspension in quantity and for a time sufficient to effect reaction of the fluorine with a substantial amount of said $Na_2N_2O_5$ to form a substantial quantity of oxygen difluoride, discharging oxygen difluoride from said zone, and recovering oxygen difluoride.

* * * * *